United States Patent

[11] 3,593,323

[72] Inventor Shunichi Suzuki
Tokyo, Japan
[21] Appl. No. 775,331
[22] Filed Nov. 13, 1968
[45] Patented July 13, 1971
[73] Assignee Nippon Electric Company, Limited
Tokyo, Japan
[32] Priority Nov. 17, 1967
[33] Japan
[31] 42/74021

[54] MAGNETIC MEMORY MATRIX WITH KEEPERS

2 Claims, 10 Drawing Figs.

[52] U.S. Cl. 340/174 BC, 340/174 M, 340/174 TF, 340/174 PW
[51] Int. Cl. G11c 5/02, G11c 11/14
[50] Field of Search 340/174, 174 TF; 335/232

[56] References Cited

UNITED STATES PATENTS

| | | | |
|---|---|---|---|
| 3,487,385 | 12/1969 | Sakai | 340/174 |
| 3,428,955 | 2/1969 | Oshima et al. | 340/174 |
| 3,483,534 | 12/1969 | Castellani et al. | 340/174 |

OTHER REFERENCES

Publication I - IBM TECH. DISCL. BULLETIN, Vol. 8 No. 9 Feb., 1966, pgs. 1278—1279

Publication II - IBM TECH. DISCL. BULLETIN, Vol. 8 No. 11, Apr. 1966, pgs. 1615— 1616

Publication III - IBM TECH. DISCL. BULLETIN, Vol. 8 No. 12, May 1966, pg. 1829

Publication IV - IBM TECH. DISC. BULLETIN, Vol. 9, No. 7, Dec. 1966, pg. 896

Publication V - IBM TECHNICAL DISC. BULLETIN, Vol. 8, No. 9, Feb. 1966, pg. 1263— 1264

*Primary Examiner*—James W. Moffitt
*Attorney*—Marn & Jangarathis

ABSTRACT: A magnetic memory matrix including magnetic memory elements spaced in parallel rows and columns, drive lines disposed over the memory element rows for selectively actuating the memory elements in memory information operations, information and readout lines disposed over the memory element columns and intersecting the drive lines at right angles, and magnetic keepers disposed over the information and readout lines to overlie crossovers of the drive lines and the information and readout lines.

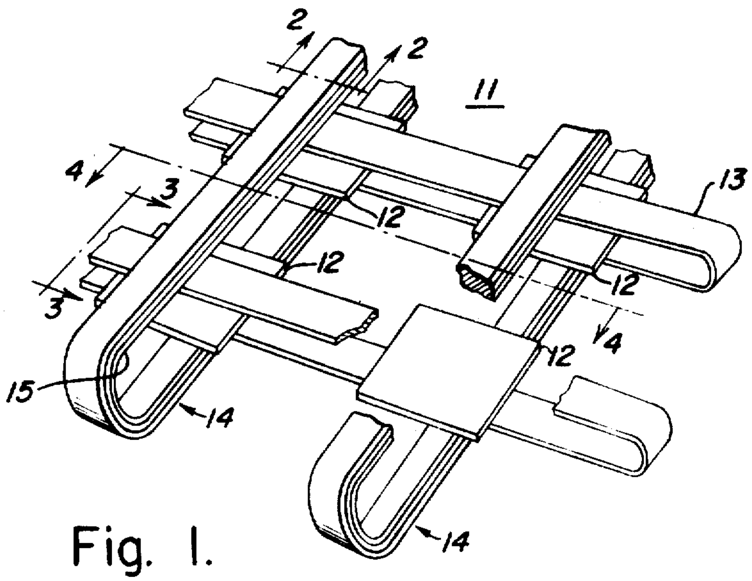
Fig. 1.
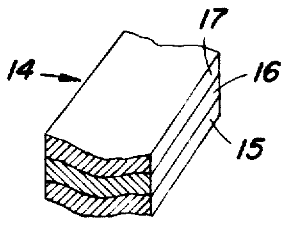
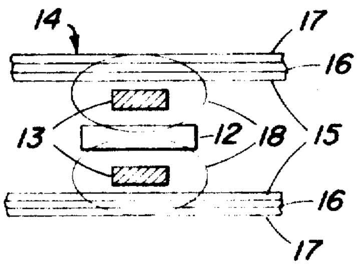
Fig. 2. Fig. 3.
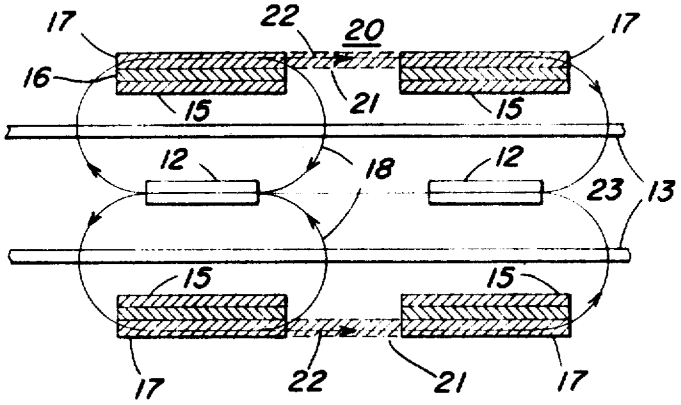
Fig. 4.
INVENTOR.
Shunichi Suzuki
BY
Marn & Jangarathis
ATTORNEYS

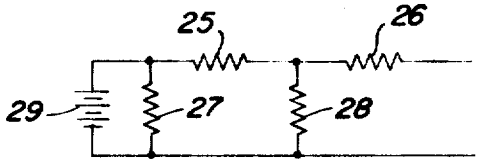
Fig. 5.
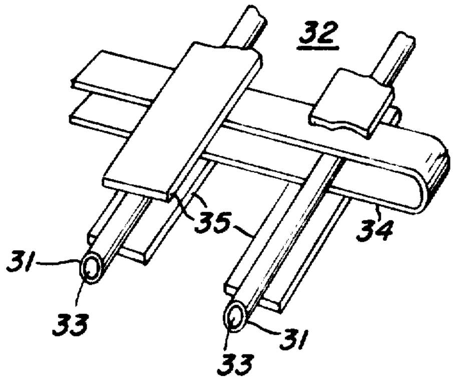
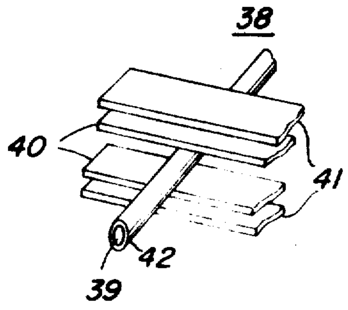
Fig. 7.
Fig. 6.
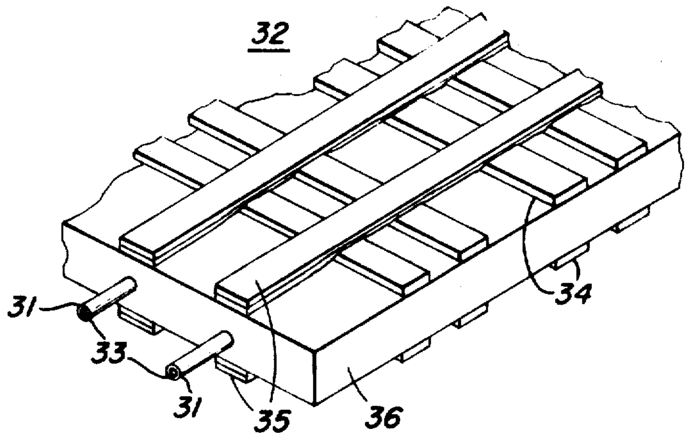
Fig. 8.
INVENTOR.
Shunichi Suzuki
BY
Mam & Jangarathis
ATTORNEYS INVENTOR.
Shunichi Suzuki
BY
Mam & Jangarathis
ATTORNEYS

MAGNETIC MEMORY MATRIX WITH KEEPERS

This invention relates to a magnetic memory matrix having intersecting drive lines and information and readout lines, and more specifically to such matrix including magnetic keepers disposed over the information and readout lines to overlie crossovers of the intersecting drive lines and the information and readout lines.

The magnetic memory art is aware of a magnetic memory matrix using planar-type magnetic thin-film memory elements aligned in the direction of the easy magnetization axes, drive lines disposed over the memory elements in parallel with such axes, and information lines and the readout lines positioned over the drive lines in a direction perpendicular to the memory element easy magnetization axis direction and thereby to the drive lines. A single line may replace one information line and one readout line. The magnetic memory matrix art is also aware of a magnetic memory matrix utilizing magnetic wires (i.e., conductive wires coated with a magnetic thin film) having the easy magnetization axes in the circumferential direction and serving as both, and information lines and readout lines, drive lines, disposed over the magnetic wires in a direction perpendicular thereto. Again, a single line may replace one information line and one readout line.

Hereinafter, unless specified otherwise, an information and readout line means one information line and one readout line or a combined information line and readout line in a planar-type thin-film magnetic memory element matrix, one information wire and one readout wire in a magnetic matrix employing magnetic wires having the easy magnetization axis in the circumferential direction, and both the information line and the readout line or the combined information and readout line intersecting a drive wire at a right angle in a magnetic wire memory matrix having the easy magnetization axes disposed in an axial direction.

Since a part of the magnetic flux passes through the portion where magnetic resistance is high in a conventional magnetic thin-film memory matrix, the effect of the demagnetizing field against the driving magnetic field is so large as to reduce the magnitude of the driving magnetic field. This necessitates increases in the magnitude of the driving current and in the length of the bit interval to minimize the effect of the demagnetizing field. In order to avoid such increases while at the same time increasing the driving magnetic field due to image current, a keeper consisting of a selected magnetic material has been used in the conventional matrix. This keeper material serves to keep the magnetic flux passing through the magnetic memory elements, and is significantly effective when a thin film is employed as a magnetic memory element in a planar-type or a magnetic wire memory matrix.

A keeper as utilized heretofore in a conventional memory matrix of the foregoing types is shaped as a plate which is suitably bonded evenly on the whole surface of the memory matrix or is shaped as a tape on another line which is bonded onto the drive wires. These keepers served the intended purpose in the conventional magnetic memory matrix but at the same time introduced two additional defects, viz., (1) an increase in interline crosstalk of information current and readout signal voltage on information and readout lines during write-in and readout operations due to the keeper having high magnetic permeability, and (2) a deterioration of the signal-to-noise ratio. It was found that even if the bit density in the direction of the information and readout lines were increased by a use of the keeper, the interval of the information and readout lines should be widened thereby introducing a one-half reduction in the effectiveness of the keeper.

The present invention contemplates a use of magnetic keepers over the outer surfaces of information and readout lines intersecting drive lines at right angles at the respective thin-film memory elements in a magnetic memory matrix.

A principal object of the present invention is to improve the fidelity of operation of a thin-film magnetic memory matrix.

Another object is to minimize crosstalk in a thin-film magnetic memory matrix.

An additional object is to improve the effectiveness of a keeper as utilized in thin-film magnetic memory matrix.

A further object is to decrease the effect of a demagnetizing field in a thin-film magnetic memory matrix.

Still another object is to minimize the impairment of a driving magnetic field in a thin-flim magnetic memory matrix.

A still additional object is to decrease the effect of a demagnetizing field against a driving magnetic field in a thin-film magnetic memory matrix.

A still further object is to provide an improved thin-flim magnetic memory matrix.

In association with a magnetic memory matrix including a plurality of discrete thin-film memory elements spaced in rows and columns; a plurality of endless drive lines, each disposed on opposite sides of and in parallel with one row of the memory elements to include the latter one element row therebetween; a plurality of information and readout lines intersecting the drive lines at right angles and disposed in parallel with the respective memory element columns to provide crossovers between the drive lines and the information and readout lines at the respective memory elements, each information and readout line including therebetween one memory element column and portions of the drive lines crossing thereat; a specific embodiment of the present invention comprises a plurality of magnetic keepers, each disposed over the outside surface of one information and readout line to overlie the crossovers of the drive lines and the information and readout lines at each memory element in one column thereof.

A modification of the present invention involves each magnetic keeper disposed over the outside surfaces of a preselected number (at least two) of adjacent information and readout lines to overlie the crossovers of the drive lines and adjacent information and readout lines at each memory element in corresponding adjacent columns thereof.

Another embodiment concerns a plurality of magnetic wires functioning as combined information and readout lines and spaced in parallel in one plane, a drive line consisting of two spaced members intersecting the information and readout lines at right angles, and a plurality of magnetic keepers, each including two spaced sections positioned over one information and readout line in parallel therewith to include crossovers of the information and readout lines and the drive lines therebetween. A further embodiment is related to a drive line, an information and readout line composed of two spaced members intersecting the drive line at a right angle, and a magnetic keeper including two spaced sections positioned over the information and readout lines in parallel therewith to include a crossover of the drive line and information and readout members therebetween.

A feature of the invention resides in the placement of the magnetic keepers in proximity of and in parallel with the opposite surfaces of the respective combined information and readout lines to intersect the drive lines at right angles. This places the keepers over the crossovers of the intersecting information and readout lines and drive lines and thereby at the positions of the memory bits, and enables an increase in the output voltage for a constant value of driving current. Another feature is that as the magnetic keeper over each combined information and readout line is separated from the adjacent keepers over adjacent combined information and readout lines, magnetic flux crossing to the adjacent combined information and readout lines and generated by the information current or by the readout signal voltage does not increase regardless of the use of the magnetic keepers. This feature results in a decrease in the magnitude of crosstalk between the information and readout lines and an improvement in the signal-to-noise ratio.

The invention is readily understood from the following description taken together with the accompanying drawing in which:

FIG. 1 is a fragmentary perspective view of a specific embodiment of the invention;

FIG. 2 is a cross-sectional view taken along line 2–2 of FIG. 1;

FIG. 3 is a cross-sectional view taken along line 3–3 in FIG. 1;

FIG. 4 is a cross-sectional view taken along line 4–4 in FIG. 1;

FIG. 5 is a schematic circuit illustrating an electrical equivalent of FIG. 1;

FIGS. 6 and 7 are partial perspective views of other embodiments of FIG. 1;

FIG. 8 is a fragmentary perspective view of an extension of FIG. 6; and

Figure 9:
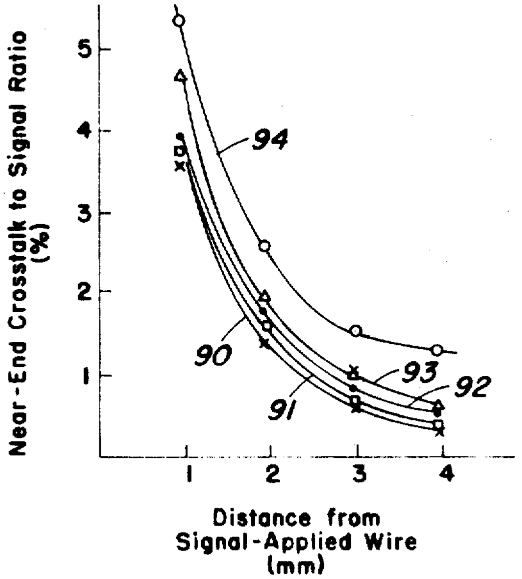
FIGS. 9 and 10 are families of graphs illustrating electrical results obtainable in FIG. 8.

FIG. 1 shows a plurality of magnetic memory elements 12 spaced in parallel rows and parallel columns in one plane, each element comprising a magnetic thin film 12 having uniaxial magnetic anisotropy; a plurality of magnetic driving lines 13, each disposed over opposite sides of the memory elements in parallel with the easy magnetization axis of one row thereof to include the latter element row therebetween; and a plurality of composite information and readout lines 14 positioned over opposite outside surfaces of the drive lines to intersect the latter lines at right angles and disposed in parallel with the respective memory element columns, each information and readout line including one memory element column therebetween. The structure of each information and readout line 14 is explained hereinafter with regard to FIG. 2.

It is thus seen in FIG. 1 that the drive lines and information and readout lines have one crossover therebetween on opposite sides of each memory element. For the purpose of this description, each thin-film memory element comprises rectangular electroplated Permalloy having 0.5 millimeter and 0.3 millimeter opposite edges and a thickness of 1000 angstroms; each drive line consists of a copper tape having a width of 0.3 millimeters and a thickness of 10 microns, and an interval of 1.0 millimeters; and each composite information and readout line includes a copper tape 15, FIG. 2, having a width of 0.2 millimeters, a thickness of 10 microns, and an interval of 0.2 millimeters. As previously noted, each composite information and readout line may comprise a combined information and readout line or individual information lines and individual readout lines. As the operation of the matrix thus far described regarding FIG. 1 is well known, an explanation of such operation is thought to be unnecessary here.

In accordance with a specific embodiment of the present invention as shown in FIGS. 1—4, the outer wide surface of each endless information and readout line tape 15 is provided with a layer of electric insulating material 16 such as, for example, polyethylene tereplithalate, on which is placed a keeper 17 comprising ferrite or other metallic magnetic material, such as, for example, Permalloy, formed into a tape or line which is coextensive with the width and length of the outside wide surface of each information and readout line tape 14. It is noted in FIG. 1 that each keeper is disposed at right angles relative to the drive lines, as is each composite information and readout line 14, to overlie the crossover of each drive line and each information and readout line at each memory element. The keepers thus function at the positions of the memory bits at the respective memory elements, and increase the output voltage in response to a constant value of driving current.

Since the keeper on each information and readout line is separated from the keepers on adjacent information and readout lines, magnetic flux crossing the adjacent information and readout lines and intermingling with the flux generated by the information current or readout signal voltage does not increase regardless of the presence of the magnetic keepers. These keepers therefore serve to reduce crosstalk between the adjacent information and readout lines and to improve the signal-to-noise ratio. It is understood that the insulating material 16 may be omitted where the magnetic material 17 used for the keepers is also a suitable electric insulator or is conductive.

FIG. 3 indicates keeper 17 restricting magnetic flux passing through the respective memory elements 12 to paths 18. As a consequence of such restriction, the demagnetizing field is weakened against the driving magnetic field and sufficient magnetic flux can be supplied to the memory elements with a relatively small value of driving current. This indicates that the keepers as used in FIGS. 1, 2 and 3 improve the relationship between the driving current and the driving magnetic field. Since keepers are not present over the drive line portions which do not overlie the respective memory elements, the impedance of the drive lines is decreased and the delay time is shortened, whereby back voltage generated in the respective drive lines is reduced.

FIG. 4 shows the information current is transmitted in the upper and lower sections of left-hand information and readout line tape 15 in opposite directions to generate two magnetic fields 18 which are added in left-hand memory element 12. Most of the magnetic flux passes through left-hand memory element 12, but a small amount of magnetic flux 22 is transmitted to right-hand keeper 17 and thereby as another small amount of flux 23 to right-hand memory element 12. Additional small amounts of magnetic flux are transmitted to other remote keepers and memory elements, not shown. It is noted that the values of magnetic flux 22 and 23 are relatively small compared with the value of magnetic flux 18. This results from a use of individual left-hand and right-hand keepers in FIGS. 1 and 4.

FIG. 4 also shows that a unitary keeper 20 may be formed by adding a middle section 21 (broken lines) to the left- and right-hand keepers 17. Normally, such unitary keeper is predetermined in area to extend over a preselected number of adjacent information and readout line tapes 15 in a given instance, such preselected number being two for the purpose of the present description. It is noted that while the unitary keeper causes increases in the amounts of magnetic flux 22 and 23, such increases were found to be tolerable. The dielectric material 16 may be omitted in FIG. 4 for the same reason that permitted its omission in FIGS. 1 and 2 as previously mentioned.

FIG. 5 showing the electrical equivalent of FIGS. 1 and 4 provides an explanation of the operation thereof in the following manner. Resistors 25 and 26 represent high magnetic resistance effective between the left-hand and right-hand adjacent keepers in FIGS. 1 and 4, resistors 27 and 28 indicate low magnetic resistance effective between the two adjacent keepers 17 and two adjacent memory elements, not shown, associated therewith, and source 29 providing a suitable voltage for activating the respective memory elements 12. As the effective magnetic resistance 25 is high, the magnitude of the activating voltage applied through magnetic resistor 27 to the memory element, not shown, associated therewith is caused to decrease sharply when applied through high magnetic resistor 25 to the next adjacent memory element, not shown, but associated with low magnetic resistance 28. Similarly, as the magnetic resistance of resistor 26 is high, the voltage of course 29 decreases still further when applied through both high magnetic resistors 25 and 26 to another magnetic resistor, not shown, similar to each of magnetic resistors 27 and 28 and associated with the next adjacent memory element, not shown. A use of separate or unitary keepers 17 in the respective information and readout lines 15 as shown in FIGS. 1—4 thus serves to increase the values of magnetic resistors 25 and 26, to decrease the magnetic flux 22 shown in FIG. 4, to decrease crosstalk between adjacent memory elements, and to improve the signal-to-noise ratio as previously mentioned.

FIG. 6 shows a second embodiment of the invention in a partial magnetic memory matrix 32 comprising a plurality of magnetic wires 33 coated with electrodeposited magnetic thin film 31 and spaced in parallel in a given direction in one plane, each wire serving as a combined information and readout line; at least one drive line 34 disposed over opposite surfaces of the information and readout lines and intersecting the latter lines at right angles in another plane parallel with the last-mentioned one plane, the drive line including portions of the information and readout lines therebetween; and a plurality of magnetic keepers 35, each disposed over the outside surface of the drive line in a plane parallel with an axis of each information and readout line to overlie each crossover of the information and readout lines and the drive line. Each information and readout wire 33 is formed by the electrodeposition of a thin 31 film of a suitable magnetic material having an easy magnetization axis lying in a circumferential direction of the magnetic wire. The drive line 34 is identical with drive line 13 in FIG. 1. The keepers 35 in FIG. 6 are similar to keepers 17 in FIGS. 1—4 and function in accordance with the principle hereinbefore described with respect to the latter keepers. It is understood that the simplified showing in FIG. 6 over FIG. 1 is for the purpose of correspondingly simplifying the description.

FIG. 7 illustrates a third embodiment of the invention in a partial conductive memory matrix 38 comprising magnetic wire 39 coated with electrodeposited magnetic thin film 42 and having an easy magnetization axis in the axial direction thereof and functioning as a drive line, an information and readout line 40 disposed over diametrically opposite points of the drive line in parallel with an axis thereof, and a plurality of magnetic keepers 41, each disposed on the outside wide surface of information and readout line 40 to include the latter line therebetween for overlying a crossover of the drive line and the information and readout line. The principle of operation of keeper 41 in FIG. 7 is identical with that of keeper 17 hereinbefore described regarding FIGS. 1—4. It is understood that the exemplified showing of FIG. 7 over FIG. 1 is for the purpose of correspondingly simplifying the description.

Figure 10:
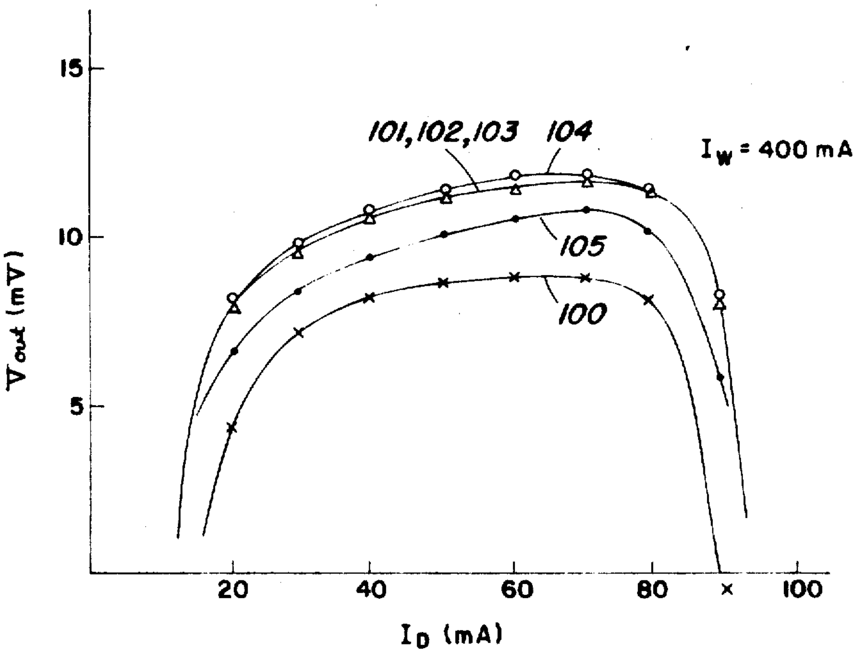

FIGS. 8, 9 and 10 provide a more detailed explanation of the second embodiment of the invention as shown in FIG. 6. Each of conductive wires 33 is coated with an electrodeposited Permalloy film 31 having a thickness of 8,000 angstroms on a phosphor bronze wire of a diameter of 0.135 millimeters. Thereafter, the two wires are molded in spaced parallel relation at a 1.0 millimeter interval in one plane in a polyethylene dielectric sheet 36 having a thickness of 0.21 millimeters. Each of a plurality of drive lines 34 comprises two turns of copper tape mounted in coextensive and parallel relation on opposite wide surfaces of the dielectric sheet to intersect the information and readout lines at right angles. Each drive line turn has thickness of 0.02 millimeters and a width of 0.3 millimeters. The spacing interval between the two turns of drive lines 34 is 0.2 millimeters while the spacing interval between adjacent drive lines is 0.7 millimeters. The drive lines are provided on the dielectric sheet by a method similar to that utilized in the manufacture of printed circuit boards.

Keepers 35 are positioned on the outer wide surfaces of the drive lines on the opposite wide surfaces of the dielectric sheet in directions to intersect the drive lines at right angles and to lie in parallel with axes of the information and readout wires. The keeper thus overlie the crossovers of the information and readout lines and the drive lines. Each keeper comprises a Permalloy tape (an alloy of 80 percent by weight of nickel and 20 percent by weight of iron) backed by a polyethylene tereplithalate film having a thickness of 10 microns for mounting on the drive lines and dielectric sheet by a double-thickness adhesive tape having a thickness of 30 microns. The memory plane of FIG. 8 may be suitably fixed on a grounded copper film having a thickness of 35 microns and formed on one surface of an epoxy glass plate having a thickness of 0.6 millimeters by use of several wrappings of a double-thick adhesive tape having a thickness of 30 microns, the latter plate and wrappings not shown.

Near-end crosstalk between the adjacent information and readout wires 33 having a length of 100 centimeters in FIG. 8 was measured by connecting each end of each wire through a resistor of the same value as the characteristic impedance of the magnetic wire (100 ohms in the instant example) to ground, and then applying pulse signals across one of the connected resistors, drive lines 34 being grounded. The relationships between near-end crosstalk and the distance (i.e., spacing interval) from the signal-applied wire thus measured are shown in FIG. 9. Curves 91, 92 and 93 represent results derived from the memory plane of FIG. 8 in which each keeper 35 has a width of 0.25, or 0.5 or 0.8 millimeters at a given time. Curve 90 represents the results of the memory plane of FIG. 8 in which keeper 35 is omitted, and curve 94 illustrates the results of the memory plane of FIG. 8 in which the keeper covers the entire opposite wide surfaces of the dielectric sheet, i.e., the keepers are not of the individual type shown in FIG. 8.

FIG. 9 thus reveals that crosstalk is reduced in FIG. 8 by use of the individual keepers therein. Moreover, crosstalk is decreased with an increase in the spacing interval or distance between adjacent wires 33 in FIG. 8 at a much greater rate than in the case of the keepers covering the entire opposite surfaces of the memory plane in FIG. 8, almost as if no keeper were used. This means that a smaller value of overall crosstalk occurs in FIG. 8 when the keepers comprise certain magnetic alloys. According to an analysis of the waveforms of near-end crosstalk, it has been found that with keepers covering the entire opposite wide surfaces of the dielectric sheet in FIG. 8 (not shown), a damping of crosstalk is so late that it requires about 400 *ns* for a damped wave of crosstalk to attenuate to 10 percent at its peak value, while the waveform of crosstalk with the keepers shown in FIG. 8 is nearly equal to that for the case of no use of keepers, and the corresponding damping time is 40 *ns*.

FIG. 10 illustrates characteristic curves 101, 102 and 103 for the memory plane in FIG. 8 in which keeper 35 is provided with different widths of 0.25, 0.5 and 0.8 millimeter, respectively. The readout output voltage $V_{ut}$ was measured through sequential steps of passing a relatively large pulse of current through one of the information and readout wires 33 in one direction, passing a pulse of information current $I_D$ through the same one information and readout wire 33 in the opposite direction while at the same time passing a pulse of driving current $I_W$ through a certain one of the drive lines 34, passing 1,000 pulses of disturbing current having a value equal to that of the current $I_D$ through the above-noted one information and readout wire 33 in the one direction, and passing a driving current through the latter certain drive line to induce a read-voltage across the one information and readout line 33. Here, driving pulse current $I_W$ was transmitted through a drive line 34 adjacent to the right-hand side of the certain drive line 34 in coincidence with each of the first half of the thousand disturbing current pulses and through another drive line adjacent to the left-hand side of the certain drive line in coincidence with each of the second half of the thousand disturbing current pulses. As the results for the keepers 35 having the three different widths in FIG. 8 as mentioned above are substantially equal, these results are represented by one curve 101, 102 and 103 in FIG. 10. Curve 100 shows the result for the memory plane in FIG. 8 in which the keepers are omitted. Curve 104 indicates the result for the memory plane in FIG. 8 modified to replace the individual keepers 35 with a single keeper, not shown, covering each of the two opposite wide surfaces of dielectric sheet 36. Curve 105 shows the result for the memory plane in FIG. 8 modified to replace the individual keepers 35 with other individual keepers, not shown, placed over the outer wide surface of each of the drive lines 34, in the latter modification the other keepers are disposed at right angles relative to the information and readout lines 33.

In the previous explanation, each keeper is placed over one information and readout line, but this is not necessary. When the magnetic permeability of the keeper is greater than that of the associated information and readout line, the existence of a small gap between keepers disposed over adjacent information and readout lines is effective as explained above regarding FIG. 4. Even if the adjacent keepers were not completely separated, but major portions thereof were separated along adjacent information and readout lines by making half-circle shape grooves in a keeper disposed over several adjacent information and readout wires, the effect of such keeper would be highly satisfactory.

Although an individual keeper is utilized for each information and readout line as previously explained, it was found that one keeper can be used for several adjacent information and readout lines because the adverse influence of neighboring information and readout lines on a given line located therebetween may not be too great and therefore tolerable. This is so because the adverse influence of the neighboring information and readout lines on the given information and readout line is accompanied by the additional adverse influence of remote information and readout lines, the latter adverse influence being considerable in magnitude. As the keeper covering several adjacent information and readout lines was found to attenuate such additional adverse influence to a satisfactory degree, a use of a keeper covering several adjacent information and readout lines was permissible.

The use of a keeper to cover two or more adjacent information and readout wires depends largely upon the number of information and readout lines that should be separated in relation to the design of a memory matrix in a given circumstance. This enables a reduction in the manufacturing cost of the memory matrix. For example, when the lengths of the information and readout lines are short, a single keeper covering twelve or more adjacent information and readout lines would not result in a considerable increase in the signal-to-noise ratio. When, however, the rise time of the current transmitted to the respective information and readout lines is short, the keepers are limited to cover six or less adjacent information and readout lines.

In a computer where one digit is represented by nine binary numbers and where a word is expressed by plural digits, it is convenient to use a keeper covering nine adjacent information and readout lines. This is permitted by the fact that since each digit is easily distinguishable in appearance due to the separation of the keepers, there is the additional matter of the facile connections available between the magnetic memory matrix and the peripheral circuits which are to be connected to the information and readout lines and which are frequently positioned as units corresponding to each digit.

The invention can be universally applied to magnetic thin-film magnetic memory matrices regardless of the types and the shapes of the thin-film, of the drive lines and of the information and readout lines embodied therein. It can also be applied to all magnetic memory matrices that utilize keepers.

It is understood that the invention herein is described in specific respects for the purpose of this description. It is also understood that such respects are merely illustrative of the application of the invention. Numerous other arrangements may be devised by those skilled in the art without departing from the spirit and scope of the invention.

I claim:

1. A planar magnetic memory matrix, comprising:

a plurality of thin-film flat memory elements aligned in spaced relation in one plane to form a plurality of spaced parallel element rows in such manner that corresponding elements in said respective rows are further aligned in spaced relation to form a plurality of spaced parallel element columns;

a plurality of flat drive lines, each containing two first elongated members spaced in mutually parallel relation over opposite central portions of said elements aligned in one of said rows thereof, and two sections each integrally joined to corresponding adjacent opposite ends of said two members to form said two members and said two end sections joined thereto into a unitary drive line disposed over said elements opposite central portions aligned in one of said element rows;

a plurality of flat information and readout lines, each consisting of two second elongated members spaced in mutually parallel relation over opposite portions of said drive lines spaced over said elements opposite central portions aligned in one of said element columns, and two further end sections each integrally joined to corresponding adjacent opposite ends of said two second members to form said last-mentioned two members and said two further end sections joined thereto into a unitary information and readout line disposed over said elements opposite central portions and said drive lines opposite portions crossing thereover in one of said element columns; and a plurality of flat magnetic keepers, each embodying two third elongated members spaced in mutually parallel relation over and in parallel with opposite outside surfaces of said two second members of one of said readout lines, and two additional end sections each integrally joined to corresponding adjacent opposite ends of said two third members to form said last-mentioned two members and end sections into a unitary keeper disposed over said memory elements opposite central portions and said drive lines opposite portions aligned in one of said element columns.

2. The matrix according to claim 1 in which said keepers are nonelectric insulating and nonelectric conductive and which includes a plurality of strips of electric insulation; each interposed between opposing surface of said unitary readout line and said unitary keeper disposed in one of said element columns to overlay said elements opposite central portions and said drive lines opposite portions aligned in said last-mentioned column.